UNITED STATES PATENT OFFICE.

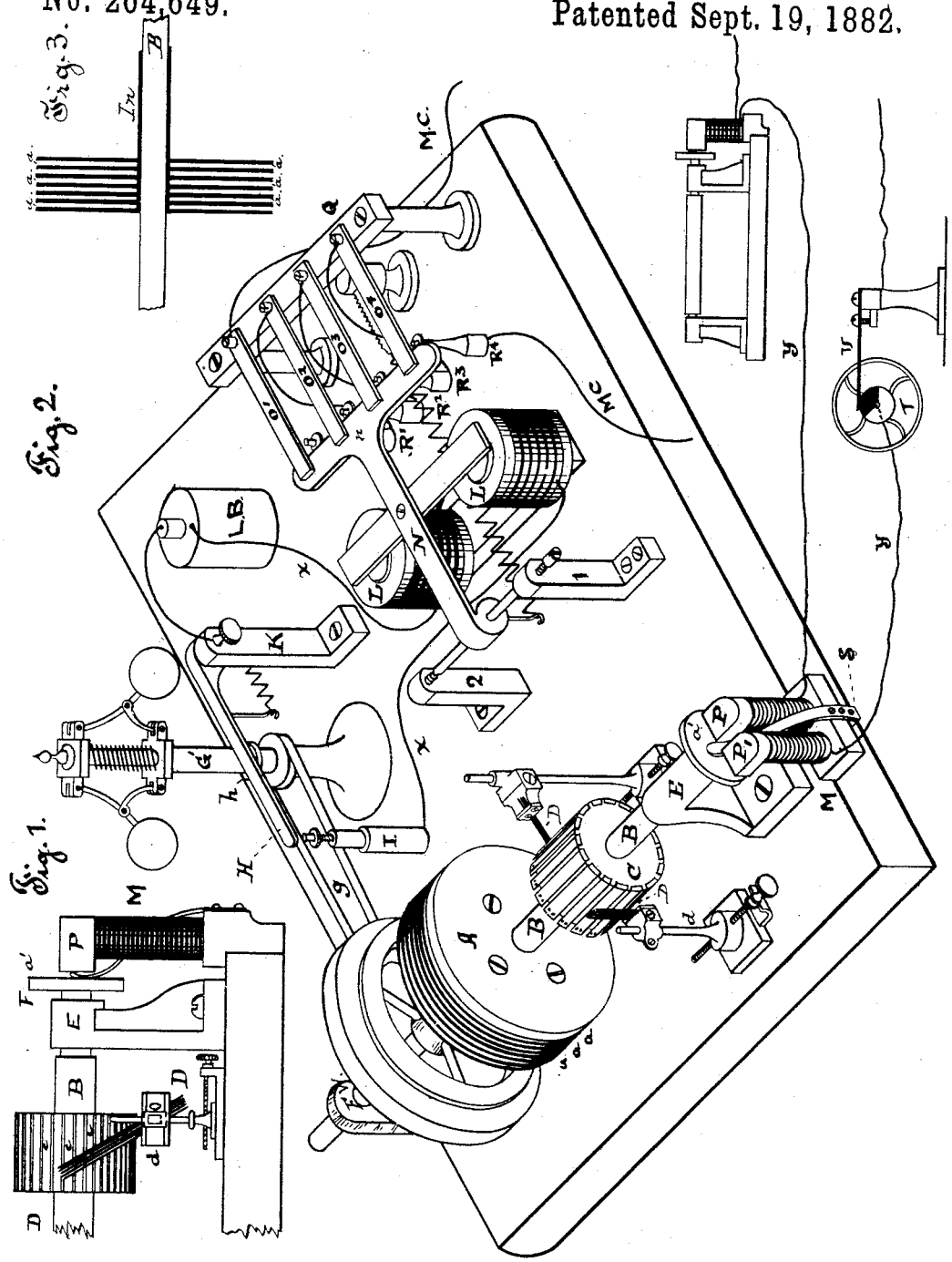

THOMAS A. EDISON, OF MENLO PARK, NEW JERSEY, ASSIGNOR TO THE EDISON ELECTRIC LIGHT COMPANY, OF NEW YORK, N. Y.

DYNAMO OR MAGNETO ELECTRIC MACHINE.

SPECIFICATION forming part of Letters Patent No. 264,649, dated September 19, 1882.

Application filed March 20, 1880. (No model.) Patented in England April 5, 1880, No. 1,385; in Canada October 9, 1880, No. 11,857; in Italy October 12, 1880; in Belgium October 15, 1880, No. 52,698; in Victoria November 17, 1880, No. 2,926; in France November 27, 1880, No. 138,941; in Austria December 24, 1880; in New South Wales January 19, 1881; in Queensland February 7, 1881; in Spain February 21, 1881; in New Zealand March 7, 1881, No. 511; in Portugal March 31, 1881, No. 660, and in India April 12, 1881, No. 278.

*To all whom it may concern:*

Be it known that I, THOMAS A. EDISON, of Menlo Park, in the county of Middlesex and State of New Jersey, have invented a new and useful Improvement in Dynamo or Magneto Electric Machines and Electric Motors, (Case No. 208;) and I do hereby declare that the following is a full and exact description of the same, reference being had to the accompanying drawings, and to the letters of reference marked thereon.

A portion of my invention relates to improvements in the rotating armatures, the arrangements of the commutator brushes or contacts, and the shaft of the rotating armature and commutator, which are applicable to both dynamo or magneto electric machines and to electric motors.

In rotating armatures made of a solid mass of metal, or of several large rings of metal, currents are induced in the armature itself, which circulate from points of greatest to those of lowest potential. To such currents is largely due the heating of the armature, so often an injurious element in such armatures. To remedy this I construct an armature of a number of very thin disks or rings secured together upon a proper shaft or base and slightly insulated from each other by sheets of tissue-paper. As currents induced in the rotating armature have very small electro-motive force, the insulation of the tissue-paper and the thinness of the plates prevent almost, if not quite entirely, the circulation of induced currents and the heating attendant thereon. By this the effective capacity of the machine for conversion is very largely increased, for while the heating at one moment is not large the covering of the armature prevents radiation and the accumulation of heat proceeds faster than its dissipation, and the armature becomes an accumulating-reservoir of heat, until the capacity of the machine for conversion is much impaired by limitation of exterior energy due to this heating, all of which is obviated by this use of exceedingly thin plates or disks. In this connection, as the word "thin" is a relative one, it is well to state that the plates should be, at most, not more than an eighth of an inch thick, and preferably very much thinner, and insulated from each other in order to attain these effects. I do not claim herein this peculiar construction of the armature-core, since it will be made the subject-matter of a separate application for patent.

Commutator springs or brushes have always been arranged at right angles to the axis of the commutator. With such there has usually been a large amount of "spark" on the face of the commutators, indicating a loss of electric energy by its conversion at a point where conversion was not only unneeded but injurious, causing a rapid destruction of the commutator apparatus. I find that this can be largely and usually entirely avoided by arranging the commutator springs or brushes so that their axial line is at an angle other than a right angle with the axis of the commutators, or, in other words, that the brushes or springs bear obliquely upon the face of the commutator. In practice I have found that it is better that the brushes or springs stand at an angle of about thirty degrees to the axis of the commutator. As ordinarily arranged, the brushes or springs travel over the face of the commutator in a uniform track, speedily wearing a groove therein, rendering the face of the commutator uneven. To remedy this, insuring even wear over the whole surface of the commutator, I arrange the shaft of the commutator and its bearings so that the shaft may have a longitudinal movement in the bearings. Upon the outer end of the shaft a disk is fixed, forming a circular armature to an electro-magnet suitably attached to the frame of the machine. When this magnet is charged, attracting the armature, the shaft is moved in one direction to its limit of motion, a spring serving to force it to the other limit when the magnet is inactive.

Attached to any rotating part of the apparatus is a disk, a portion of whose periphery is of insulating material, the remainder being a conductor; or the disk may have several alternating conducting and non-conducting portions. Upon the disk bears a contact-spring, the disk and spring being interposed in a circuit leading from a battery or other source of electricity to the magnet last spoken of, or the current therefor through a shunt may be a portion of the current of the machine itself. One rotating disk and spring may be arranged to control the circuit of the shaft-moving magnets of a large number of machines or motors.

In providing electromotors for any given work it is desirable that any one motor should be constructed to give the maximum power required with a certain definite current. As is the case with all motors, however, it may be desired to use the motor for less than its maximum capacity—that is, to run it with a variable load or amount of work to be performed. It is preferable that it should be provided with a governor to correct any fluctuations in speed consequent upon such variation in load or work. To accomplish this I place on the main shaft, or I gear to it either directly or by belting, a centrifugal governor, which lifts, upon too great speed, an adjustable circuit-lever, controlling by either making or breaking directly or indirectly the circuit to the motor. This lever may control directly the circuit to the motor passing through it, or it may control indirectly by controlling a local-battery circuit to a magnet whose armature-lever operates a circuit-breaker placed in the motor-circuit.

In order to prevent too sudden fluctuations upon the breakage of circuit, and to maintain regularity while the current is on, the main shaft is provided with a heavy fly or balance wheel whose momentum prevents irregularities and causes gradual slowing down when the circuit is broken. As the circuit-controlling lever of the governor completes the circuit through an adjustable stop, the joint effects of the governor and fly-wheel are that the machine is capable of the finest adjustment, breaking and completing the circuit upon the least variation from a determined desired speed, acting exactly, so to speak, as an automatic cut-off in steam-engines, preventing unnecessary consumption of energy. The breaking of the main circuit occasions a large spark at the breaking-point, which is more destructive as a unit than it would be if divided into several sparks. Hence I break the main circuit, when breakage is necessary, at several points simultaneously, in order to divide the spark and lessen its total injurious effect. I accomplish this by fixing upon an insulating-base several contact-springs, the free ends of which rest, each respectively, upon proper contact-posts and project slightly beyond the same. The circuit is led to one post, passes to its spring, whence it passes by a wire to the next post, into its spring, by wire to next post, and so on through the series of springs and posts. Either the circuit-controlling lever or the armature-lever, as either is used for the purpose, as before explained, is broadened at the end, so as to take under the extreme free ends of all the circuit-springs, and upon desired movement lift them all simultaneously from their posts, breaking the main circuit at a number of points.

In the drawings, Figure 1 is a detailed view of several parts detached from Fig. 2, which is an isometric view of a machine embodying the improvements which form the invention herein claimed. Fig. 3 is a sectional view of part of the armature-core.

A is the rotating armature-core divested of its external winding, which revolves between polar extensions of magnets, not necessary to be shown. This armature is composed of a number of thin plates, rings, or disks secured upon the shaft B, thin pieces of insulating material, preferably tissue-paper, alternating with the plates, rings, or disks, and separating each of them from all the others. The black lines $a\ a$ show the metallic plates, the intermediate white lines representing the insulating material. The plates, disks, or rings should not exceed one-eighth of an inch in thickness, while the best results are obtained when the thickness is from one sixty-fourth to one thirty-second of an inch.

D D are the commutator brushes or springs, secured in stands $d$, capable of horizontal and vertical adjustment, as shown. As more clearly shown in Fig. 1, the springs or brushes are placed obliquely to the axis of the commutator, preferably at an angle of about thirty degrees. The shaft B of the revolving armature and of the commutator is supported in boxes E, and is arranged to have a longitudinal movement therein. Upon the end of the shaft B is fixed a disk, $a'$, which forms the armature for a magnet, M, whose poles P P' are extended, as shown, to exert their influence upon $a'$. Through the magnet passes an electrical circuit, $y\ y$, in which is placed a circuit-interrupter, consisting of a spring, U, whose free end bears upon a hub or disk, T, whose surface is composed of alternate conducting and non-conducting material, one or a series of alternations being used. While the spring U bears on a conducting portion of T the circuit through M is complete, and the poles P P' attract $a'$, pulling the shaft B to its limit of movement in one direction. When the circuit is broken a spring, $s$, forces the shaft to its limit in the opposite direction.

The hub or disk T may be attached to any rotating part of a machine, or it may be driven by an independent motor. If it be so geared that its rate of speed is different from that of B, the movements of B will not occur at the same relative times in consecutive rotations, and the wear of the commutator will be evenly distributed over its whole face, and it will be thereby evenly worn and polished.

One circuit-breaker, U T, may control the circuit for a number or battery of generators or motors; or a series of them may be arranged upon one shaft, each controlling the circuit to a generator or to a motor, and arranged to operate in succession.

G is a centrifugal governor, connected to the shaft B by a belt, $g$. It is evident, however, that this governor may be placed on the shaft, or may be geared directly thereto. The sliding tube G' of the governor, raised or lowered by the action of the governor-balls, carries a shoulder, $h$, taking under a pivoted lever, H, whose free end normally rests upon an adjustable stop, I. The circuit $x\ x$ of a small battery, L B, passes through the lever H and stop I. This circuit $x\ x$ also passes through an electro-magnet, L L, whose armature-lever N is pivoted in suitable standards, 1 2. The free end of this lever N is widened out into a plate, $n$, which takes under the free ends of a series of circuit-springs, (in this case four in number,) O' $O^2$ $O^3$ $O^4$, which number, however, may be greater or less, as desired. These springs are attached to an insulating-support, Q, and are arranged, when not lifted by N $n$, to rest upon contact-posts R' $R^2$ $R^3$ $R^4$. The motor-circuit M C passes to the spring O' and post R', then by wire to spring $O^2$ and post $R^2$, and so through the series.

The lever H and post I are adjusted so that they shall remain in contact whenever a desired predetermined speed is not exceeded, but that H shall be lifted from I when such speed is exceeded. In this latter event the circuit $x\ x$ is broken between H and I, the magnet L is discharged, the armature-lever N is raised by the force of its spring, lifting the springs O' $O^2$, &c., from their posts and breaking at each the motor-circuit M C. By this means a motor may be kept in action with a steady speed and the destructive effects of one large main-circuit spark lessened very materially by dividing into several minor sparks; or by increasing the number of springs and contact-posts for breaking the main circuit any sensible spark effect may be entirely obviated.

If desired, the battery L B, circuit $x\ x$, and magnet L L may be dispensed with and the springs O' $O^2$ $O^3$ $O^4$, &c., be operated directly by the lever H. Further, several magnets L L and armatures might be used, one being assigned for each spring or for each division of two or more springs of the entire number used. In addition, upon the shaft B is mounted a heavy fly or balance wheel, F W, whose momentum serves to avoid too sudden fluctuations in speed upon breaking the circuit.

What I claim is—

1. The combination, with a commutator, of a contact brush or brushes and a brush holder or holders supporting the brush or brushes upon the face of the commutator at an angle to the axis of rotation thereof, substantially as set forth.

2. The combination of a commutator, contact brushes or springs arranged at an angle to the axis of the commutator, and brush-holders having both a vertical and horizontal adjustment, substantially as set forth.

3. In a dynamo or magneto electric machine, the combination, with the revolving commutator-cylinder and means for automatically giving such cylinder a continuous longitudinal reciprocating movement equal to the length of the commutator-cylinder, of stationary commutator-brushes bearing on such cylinder, whereby the commutator-cylinder will be worn evenly and smoothly, substantially as set forth.

4. In a dynamo or magneto electric machine, the combination of the revolving commutator-cylinder with a magnet and a circuit-controlling device giving said cylinder a longitudinal reciprocating movement, and stationary commutator-brushes, whereby the commutator-cylinder will be worn evenly and smoothly, substantially as set forth.

5. The combination, with the main circuit, of a circuit-breaker, constructed as described, adapted to break or close the main circuit at several points simultaneously, substantially as set forth.

This specification signed and witnessed this 11th day of March, 1880.

THOMAS A. EDISON.

Witnesses:
Z. F. WILBER,
JOHN C. SCHROEDER.